US010017844B2

(12) United States Patent
Detor et al.

(10) Patent No.: US 10,017,844 B2
(45) Date of Patent: Jul. 10, 2018

(54) COATED ARTICLES AND METHOD FOR MAKING

(71) Applicant: GENERAL ELECTRIC COMPANY, Schenectady, NY (US)

(72) Inventors: Andrew Joseph Detor, Albany, NY (US); Leonardo Ajdelsztajn, Niskayuna, NY (US); Thomas Michael Bigelow, Glenville, NY (US); Richard Didomizio, Amsterdam, NY (US); Andrew William Emge, West Chester, OH (US); James Anthony Ruud, Delmar, NY (US); Michael James Weimer, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 134 days.

(21) Appl. No.: 14/974,755

(22) Filed: Dec. 18, 2015

(65) Prior Publication Data

US 2017/0175244 A1 Jun. 22, 2017

(51) Int. Cl.
*B32B 15/00* (2006.01)
*C23C 4/073* (2016.01)
(Continued)

(52) U.S. Cl.
CPC ................ *C23C 4/073* (2016.01); *B22F 9/04* (2013.01); *B22F 9/16* (2013.01); *C22C 19/07* (2013.01);
(Continued)

(58) Field of Classification Search
None
See application file for complete search history.

(56) References Cited

U.S. PATENT DOCUMENTS 4,279,575 A 7/1981 Avery
4,758,480 A * 7/1988 Hecht .................... B32B 15/01 148/428
(Continued)

FOREIGN PATENT DOCUMENTS

CN 101994114 A 3/2011
CN 103866319 A 6/2014
(Continued)

OTHER PUBLICATIONS

C.E. Shamblen et al., "Effect of Inclusions on LCF life of HIP Plus Heat Treated Powder Metal René 95", Metallurgical Transactions B, vol. 16B, Issue 4, pp. 775-784, Dec. 1985.
(Continued)

*Primary Examiner* — Seth Dumbris
(74) *Attorney, Agent, or Firm* — GE Global Patent Operation; Nitin Joshi

(57) ABSTRACT

An article includes a substrate comprising a precipitate-strengthened alloy and a coating disposed over the substrate. The alloy comprises a) a population of gamma-prime precipitates, the population having a multimodal size distribution with at least one mode corresponding to a size of less than about 100 nanometers; or b) a population of gamma-double-prime precipitates having a median size less than about 300 nanometers. The coating comprises at least two elements, and further comprises a plurality of prior particles. At least a portion of the coating is substantially free of rapid solidification artifacts. Methods for fabricating the article and for processing powder useful for fabricating the article are also provided.

14 Claims, 1 Drawing Sheet

(51) Int. Cl.

| | |
|---|---|
| ***B22F 9/04*** | (2006.01) |
| ***B22F 9/16*** | (2006.01) |
| ***C22F 1/10*** | (2006.01) |
| ***C22C 19/07*** | (2006.01) |
| ***C22C 30/00*** | (2006.01) |
| ***C23C 4/129*** | (2016.01) |
| ***C23C 4/123*** | (2016.01) |
| ***C23C 4/134*** | (2016.01) |
| ***F01D 5/08*** | (2006.01) |
| ***F01D 25/00*** | (2006.01) |

(52) U.S. Cl.

CPC ................ *C22C 30/00* (2013.01); *C22F 1/10* (2013.01); *C23C 4/123* (2016.01); *C23C 4/129* (2016.01); *C23C 4/134* (2016.01); *F01D 5/08* (2013.01); *F01D 25/007* (2013.01); *B22F 2301/052* (2013.01); *B22F 2301/15* (2013.01); *B22F 2301/20* (2013.01); *B22F 2301/45* (2013.01); *F05D 2230/90* (2013.01); *F05D 2240/24* (2013.01); *F05D 2300/175* (2013.01); *F05D 2300/177* (2013.01); *F05D 2300/611* (2013.01); *Y10T 428/12931* (2015.01); *Y10T 428/12944* (2015.01)

(56) References Cited

U.S. PATENT DOCUMENTS 4,820,356 A * 4/1989 Blackburn ................ C22F 1/10 148/410
4,888,253 A * 12/1989 Snyder .................. C22C 19/055 148/410
4,915,746 A 4/1990 Welsch
4,940,523 A 7/1990 Takeshima
5,236,788 A 8/1993 Manier et al.
5,507,623 A 4/1996 Kojima et al.
5,614,294 A 3/1997 Downs et al.
7,553,384 B2 6/2009 Groh
7,687,105 B2 3/2010 Spitsberg et al.
7,927,709 B2 4/2011 Eichmann et al.
8,021,742 B2 9/2011 Anoshkina et al.
8,029,596 B2 10/2011 Arrell et al.
8,043,718 B2 10/2011 Kulkarni et al.
8,992,699 B2 3/2015 Bain et al.
8,992,700 B2 3/2015 Bain et al.
9,328,918 B2 5/2016 Ajdelsztajn et al.
2008/0213099 A1 9/2008 Imano et al.
2009/0035601 A1* 2/2009 Litton ..................... B32B 15/01 428/637
2009/0057275 A1 3/2009 Chen et al.
2009/0297720 A1* 12/2009 Ramgopal ................. C23C 4/06 427/455
2012/0027607 A1* 2/2012 DiDomizio ............. C22C 19/03 416/223 R
2012/0096714 A1 4/2012 Bishop et al.
2012/0124832 A1 5/2012 Bunker et al.
2013/0153089 A1* 6/2013 Ajdelsztajn ............. C23C 24/04 148/426
2016/0160661 A1 6/2016 Balbach et al.
2016/0305319 A1 10/2016 Baldiga et al.

FOREIGN PATENT DOCUMENTS

EP 2 138 612 A2 12/2009
EP 2 390 570 A2 11/2011
EP 2 781 560 A1 9/2014

OTHER PUBLICATIONS

Extended European Search Report and Opinion issued in connection with corresponding EP Application No. 16202621.5 dated May 17, 2017.

Mourer, D.P., et al., Coatings for metallic substrates, GE co-pending U.S. Appl. No. 61/779,427, filed Mar. 13, 2013.

* cited by examiner

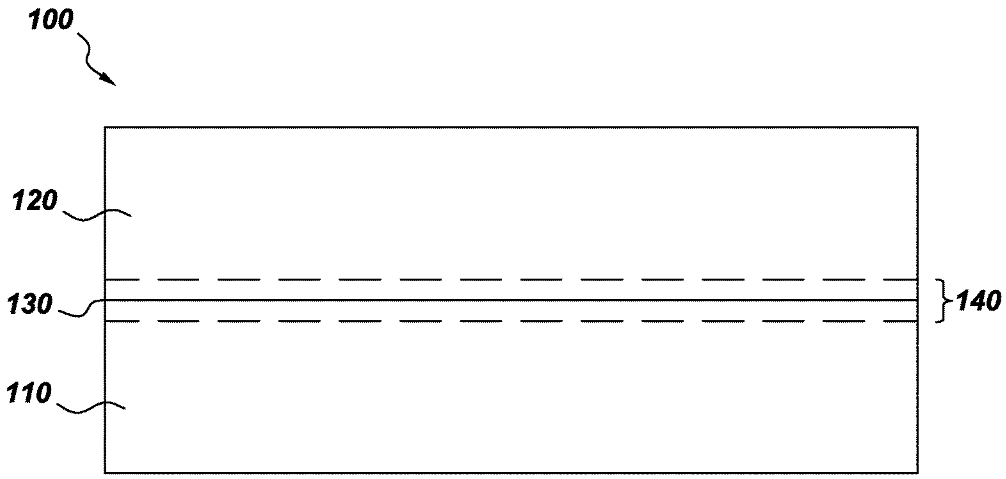
100
120
130
140
110

COATED ARTICLES AND METHOD FOR MAKING

BACKGROUND

This disclosure generally relates to articles coated with protective materials. More particularly, this disclosure relates to articles coated with oxidation- and corrosion-resistant coatings for use at high temperature, and methods for fabricating such articles.

Materials used for high-temperature applications, such as, for instance, gas turbine assembly components, are typically optimized to provide excellent mechanical properties at high temperatures. This optimization often sacrifices somewhat the resistance of the materials to high temperature corrosion and oxidation. To improve the overall performance of components made with such materials, coatings of various types are often applied to enhance component surface properties. For example, a substrate made of a nickel-based superalloy may be coated with an oxidation-resistant material such as a so-called "MCrAlX" coating, that is, a coating that includes chromium, aluminum, and (as represented by the generic "M") one or more of nickel, cobalt, and iron. The optional "X" component of the coating, if present, is typically one or more additional elements, such as yttrium, rare earth elements, or reactive elements added to enhance certain properties of the material.

MCrAlX and other coatings are typically applied using thermal spray techniques. For example, combustion thermal spray devices are currently used to produce metallic coatings through particle melting, or partial melting, and acceleration onto a substrate. Such devices use a combustion process to produce gas temperatures above the melting point of the particles and gas pressures to impart velocity to the particles. One common problem encountered in the combustion thermal spray process is the susceptibility of the sprayed metal powder to oxidation. It is important to reduce the amount of oxygen present in the metal coating to improve the formability of the coating, and to make the coating less brittle.

Combustion cold spray techniques such as those disclosed in commonly assigned U.S. patent application Ser. No. 12/790,170 have been developed to enable formation of dense deposits of materials without substantially heating the materials above their melting points. While these techniques have provided attractive results, under certain conditions articles coated using these techniques have shown sub-optimal mechanical performance. Thus, there remains a need for coated articles that minimize performance debits attributable to the presence of the coating, and for methods for producing such articles.

BRIEF DESCRIPTION

Embodiments of the present invention are provided to meet this and other needs. One embodiment is an article. The article comprises a substrate comprising a precipitate-strengthened alloy and a coating disposed over the substrate. The alloy comprises a) a population of gamma-prime precipitates, the population having a multimodal size distribution with at least one mode corresponding to a size of less than about 100 nanometers; or b) a population of gamma-double-prime precipitates having a median size less than about 300 nanometers. The coating comprises at least two elements, and further comprises a plurality of prior particles. At least a portion of the coating is substantially free of rapid solidification artifacts.

Another embodiment is a method comprising: heat-treating a quantity of metallic powder, the powder having particulates comprising at least two elements and a plurality of rapid solidification artifacts present within the particulates, wherein the heat-treating is performed at a combination of time and temperature effective to remove substantially all of the rapid solidification artifacts from the powder, thereby forming a processed powder having a desired particle size distribution. The processed powder may be used for fabricating a coated article as described above.

Another embodiment is a method comprising: disposing a coating onto a substrate by spraying a feedstock, the feedstock comprising a plurality of particulates comprising at least two elements and being having at least a portion of the plurality of particulates substantially free of rapid solidification artifacts; wherein spraying the feedstock comprises using a deposition technique that does not melt a majority substantial portion of the particulates in the feedstock; wherein the substrate comprises a precipitate-strengthened alloy, the alloy comprising a) a population of gamma-prime precipitates, the population having a multimodal size distribution with at least one mode corresponding to a size of less than about 100 nanometers; or b) a population of gamma-double-prime precipitates having a median size less than about 300 nanometers.

DRAWINGS

These and other features, aspects, and advantages of the present invention will become better understood when the following detailed description is read with reference to the accompanying drawing in which like characters represent like parts, wherein:

FIG. 1 provides a schematic cross-section of an illustrative, non-limiting embodiment of the invention.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

Coatings of MCrAlX material, such as CoNiCrAlY material, impart desirable oxidation resistance and corrosion resistance to superalloy substrates. However, when superalloy substrates were coated with MCrAlX material via combustion cold-spray high-velocity air-fuel (HVAF) techniques, the coated specimens showed inferior low-cycle fatigue life in a specific temperature and stress range relative to specimens without the coating. Indeed, this problem of reduction in substrate mechanical properties associated with the application of overlay coatings such as MCrAlX-type coatings has been well-documented in the technical literature for many years. The present inventors discovered that this debit in low-cycle fatigue life was due at least in part to the presence of brittle phases in the coating; these phases provided crack initiation sites during testing. Further analysis demonstrated that these phases were present either in the as-received powder used to produce the coating, or were formed during heat-treatment of the coating after deposition onto the superalloy substrate.

The source of this problem of deleterious phase content in these MCrAlX coatings was ultimately traced to the manufacturing process used to form the powders. These materials are formed via atomization, in which molten metal of the desired composition is sprayed through a nozzle to form tiny droplets of liquid metal that rapidly solidify to form solid particles. The solidification of highly alloyed materials such as MCrAlX material results in several distinctive features, including but not limited to the formation of dendrites, the generation of significant chemical segregation between dendritic and interdendritic regions, and the formation of deleterious interdendritic phases such as sigma phase. These features of rapid solidification of highly alloyed materials, attributable to chemical segregation, are well known in the art of metal processing and are collectively referred to herein as "rapid solidification artifacts."

The HVAF-based process used to produce the MCrAlX coatings generally did not melt a substantial portion of the powder particles used as feedstock; as a result, the coating retained the rapid solidification artifacts present in the as-received powder. The high degree of chemical segregation in the coating material provided conditions that favored the retention of artifact phases during subsequent heat treatment of the coated articles. The time and temperature combinations for post-coating heat treatment were limited due to the temperature sensitivity of the superalloy substrates, but in general the high levels of chemical segregation could further promote formation of undesirable intermetallic phases, such as sigma phase and alpha-chromium, if thermal exposure during heat treatment or service occurs at sufficiently high temperature and/or for prolonged exposure times. In addition, coatings produced with typical thermal spray processes which do melt a substantial portion of the feedstock particles will obtain rapid solidification artifacts from the solidification of the feedstock particles upon deposition due to the rapid cooling occurring during the spray deposition process.

Superalloys are well known in the industry to have desirable strength and other mechanical properties at high temperatures, such as, for instance, temperatures near 800 degrees Celsius. These properties are typically controlled in large part by certain features of the alloy microstructure, such as, for instance, the amount, size, and size distribution of intermetallic precipitates, the grain size, and grain morphology. These features are known to be sensitive to temperature; substantial thermal excursions to temperatures near or above the solvus temperature of a key strengthening precipitate phase of a superalloy will, for instance, alter precipitate size and morphology characteristics, which in turn will alter the properties of the component.

The temperatures required to remove the rapid solidification artifacts from the MCrAlX coatings were higher than could be applied to the coated articles without significantly damaging the mechanical properties of the superalloy substrates. Thus, the present inventors have developed techniques as described herein for producing articles that overcome the noted shortcomings of conventional processes. As a result, articles in accordance with embodiments described herein include a heat-sensitive substrate, such as a superalloy-bearing substrate, that retains its desired microstructure, yet also bears a coating made of an alloyed material that is in a state typically attributed to having undergone significant high-temperature heat treatment, that is, having a microstructure that is substantially free of the deleterious intermetallic phases, dendritic structures, and attendant chemical segregation that are artifacts of the conventional powder production process and its associated rapid solidification from a melt via atomization and/or that are artifacts of the conventional thermal spray processes and their rapid solidification from molten particles via deposition.

Referring now to FIG. 1, an article 100 comprises a substrate 110 and a coating 120 disposed over substrate 110. Article 100 is useful for high temperature service, such as for turbomachinery components. In one embodiment, article 100 is a component of a gas turbine assembly, such as a turbine disk.

Substrate 110 includes a precipitation-strengthened alloy, meaning an alloy that includes one or more populations of precipitates that function to strengthen the alloy. Superalloys, such as nickel-based superalloys and nickel-iron-based superalloys, are examples of precipitation-strengthened alloys. Examples of nickel-based superalloys include, without limitation, those alloys known in the art as Rene® 88, Rene® 88DT, Rene® 104, Rene® 65, Rene® 95, RR®1000, Udimet® 500, Udimet® 520, Udimet® 700, Udimet 720. Uidimet® 720LI, Waspaloy®, Astroloy®, Discaloy®, AF115, ME16, N18, and IN100®. Other superalloy compositions include those described in U.S. Patent application Ser. No. 12/474,580 and 12/474,651. Further examples of superalloys include, without limitation, those alloys known in the art as IN718®, IN725, and IN706®.

In many superalloy materials, a significant portion of strengthening is provided by so-called gamma-prime precipitates. More specifically, the population of gamma-prime precipitates has a multimodal size distribution with at least one mode of the population corresponding to a size of less than about 100 nanometers, such as, for instance, from about 10 nanometers to about 50 nanometers. Such a multimodal distribution is characteristic of nickel-based superalloys used in, for instance, turbine disk applications, where discernable modes in the precipitate size distribution can often be attributed to primary, secondary, and sometimes tertiary gamma-prime. A superalloy microstructure in this condition is susceptible to undesirable coarsening of the fine gamma-prime in the distribution if the alloy is heated to a temperature above about 800 degrees Celsius, depending on the particular alloy.

Moreover, in other superalloys such as IN718, IN706, and IN 725, a significant portion of strengthening is provided by so-called gamma-double-prime precipitates. More specifically, the population of gamma-double-prime precipitates has a median size less than about 300 nanometers, such as, for instance, from about 10 nanometers to about 150 nanometers. Fine gamma-double-prime is very important to attaining desired levels of high-temperature properties in these alloys, but a microstructure in this condition is susceptible to undesirable coarsening of the fine gamma-double-prime in the distribution if the alloy is heated to a temperature above about 600 degrees Celsius, depending on the particular alloy.

Coating 120 comprises at least two elements. Because it comprises more than one element, it is potentially susceptible to chemical segregation during solidification, depending in part on the nature of the constituent elements and the processing details. Generally, as the number of constituent elements in a material increases, the greater the likelihood that solidification of the material will undergo some chemical segregation.

Coating 120 further comprises a plurality of prior particle boundaries, which is indicative of its having been deposited using a thermal spray method as opposed to other methods, such as sputtering, electron-beam physical vapor deposition, chemical vapor deposition, and others that do not involve acceleration of powder particles onto the substrate. The use of the combustion cold spray technique noted previously maintains the particles in substantially solid state, resulting in a coating that includes deformed prior particles adhered together at their particle boundaries. These boundaries are generally visible in the finished coating using microscopy.

Notably, at least a portion of coating 120 is substantially free of rapid solidification artifacts, such as dendrites and dendrite-like structures, significant chemical segregation between dendritic and interdendritic regions, and deleterious interdendritic phases. In some embodiments, this portion is at least about 10 volume percent of the coating, and in certain embodiments, at least about 50 volume percent of the coating. In particular embodiments, this portion is at least about 70 volume percent of the coating. The microstructure of this portion of coating 120 is more indicative of chemical equilibrium than would be expected from a coating fabricated from a combustion cold spray process using conventional, atomized alloy powders as feedstock. This provides fewer crack initiation sites and increased ductility within the resulting coating 120 and helps to improve mechanical performance of article 100.

In some embodiments, coating 120 includes a composition that comprises aluminum, chromium, and M, where M is defined to include one or more of nickel, cobalt, and iron. In particular embodiments, the coating composition is designed to impart a higher degree of resistance to oxidation and/or corrosion than is possessed by the superalloy substrate. The environmental resistance of the coating composition in this regard is often provided by elevated levels of aluminum and/or chromium relative to superalloy compositions. For instance, in some embodiments the coating composition comprises aluminum at a concentration higher than a concentration of aluminum in substrate 110. In certain embodiments, coating 120 comprises aluminum at a concentration of at least about 2 weight percent, and in particular embodiments the aluminum concentration is at least about 5 weight percent. In some embodiments, the coating composition comprises chromium at a concentration of at least about 10 weight percent. In particular embodiments, the coating composition includes at least about 5 weight percent aluminum and at least about 10 weight percent chromium. The M component (nickel, cobalt, iron, or combinations of these) is typically present at higher levels than the aluminum and chromium, such as at levels of at least about 50 weight percent.

The coating composition may further include other elements. An MCrAlY composition is a typical example, where the composition described above further includes yttrium, often in an amount less than about 3 weight percent, such as less than about 1 weight percent. More generally, in some embodiments the composition is an "MCrAlX" composition, meaning it comprises M (as defined previously), chromium, aluminum, and optionally X, where X includes one or more additional elements such as yttrium, rhenium, tantalum, molybdenum, rare earth elements, and/or so-called reactive elements such as hafnium, zirconium, or silicon. In certain embodiments, the coating includes a CoNiCrAlY composition. Materials of this type are well known in the art and are readily available commercially. One example of a CoNiCrAlY composition includes the following (all percentages are by weight of coating): from about 28 percent to about 35 percent nickel, from about 17 percent to about 25 percent chromium, from about 5 percent to about 15 percent aluminum, and from about 0.01 to about 1 percent yttrium, with cobalt present in the remainder along with any other alloying elements and incidental impurities.

Notably, in certain embodiments the material of coating 120, such as an MCrAlX material, includes a gamma phase (face-centered cubic nickel-rich phase) and a beta phase (ordered body-centered-cubic phase of nominal composition NiAl). Beta phase is characterized by high resistance to oxidation, but is generally not present in superalloy compositions. On the other hand, as-atomized MCrAlX materials often contain very high amounts of beta, such as 90 volume percent or more. In some embodiments of the present invention, the coating 120 includes at least about 10 volume percent beta phase, but not more than about 90 volume percent, and in certain embodiments not more than about 75 percent by volume. In particular embodiments, coating 120 includes beta phase in a range from about 10 volume percent to about 60 volume percent. Typically, obtaining a significant portion of gamma phase using as-received MCrAlX powder, for instance, as feedstock is difficult due to the rapid solidification of the powder during its manufacture. In stark contrast, coating 120 in accordance with some embodiments of the present invention includes at least about 10 percent by volume of gamma phase, and in certain embodiments includes at least about 25 percent by volume gamma phase. In particular embodiments the gamma phase is present at a concentration of at least about 40 percent by volume. Further, in some embodiments, the coating comprises beta phase in a range from about 10 volume percent to about 75 volume percent, and at least about 25 volume percent gamma phase. Moreover, the microstructure of coating 120 is remarkably low in deleterious intermetallic phases; in some embodiments the coating 120 comprising gamma and beta phases (including any combination of the concentration ranges of these phases described previously) also has less than 1 percent of sigma phase by volume. These microstructural attributes may substantially reduce debits in mechanical properties attributable to the presence of coating on substrate 110.

As noted above, with its remarkably low level of rapid solidification defects, the coating 120 has microstructural attributes generally associated with material that has been heat treated to allow, for instance, segregation effects to dissipate through diffusion over time at temperature. On the other hand, the substrate material, with its fine precipitate structure, has microstructural attributes generally associated with material that has not been heated to temperatures near the precipitate solvus temperature. In the example where coating 120 comprises a high temperature material such as MCrAlX, this contrast is remarkable because the heat treatment required to convert the rapid solidification artifacts of the MCrAlX material would necessitate heating the coated article to a temperature that would substantially alter the microstructure of the substrate 110, if the article were produced by conventional methods.

Moreover, in a typical high-temperature heat treatment of a coated article similar in form to article 100, where a coating and its substrate meet at an interface, an interdiffusion zone develops at the interface. This zone develops as a result of diffusion during heat treatment, as elements diffuse generally toward regions of lower respective concentration. Depending on the relative concentrations of various elements within the substrate and the coating, and the relative rates of diffusion of these elements in the coating and substrate materials, this interdiffusion zone can extend into the coating, into the substrate, or both. For the purposes of this disclosure, regardless of whether it extends into the substrate, into the coating, or both, the interdiffusion zone is described to be positioned between the coating and the substrate.

Because a substantial heat treatment is not required in processing article 100 of the present invention to remove rapid solidification defects from coating 120, for example, there is much less driving force for interdiffusion zone formation relative to what would be created in a more conventionally processed article, which would require substantial heat treatment to achieve similar microstructural attributes to coating 120 and substrate 110 in accordance with embodiments of the present invention. In some embodiments, coating 120 is disposed in direct contact with substrate 110 at an interface 130, and an interdiffusion zone 140 between coating 120 and substrate 110 has a thickness of less than about 5 micrometers. It will be appreciated that "less than 5 micrometers" contemplates embodiments in which an interdiffusion zone is not detectable, i.e., has zero thickness. A reduced interdiffusion zone 140 enhances the properties of article 100 by limiting the extent of deleterious phase formation that can occur in this region of mixed chemical composition.

Coating 120 thickness is often selected to be as thin as possible while maintaining a desired level of protection. In some embodiments, nominal thickness is less than about 250 micrometers; in certain embodiments, the thickness is less than 100 micromenters, and in particular embodiments, the thickness is less than about 50 micrometers.

The following example is provided to further illustrate the above descriptions. In one embodiment, article 100 comprises a substrate 110 comprising a nickel-based superalloy. The nickel-based superalloy comprises a population of gamma-prime precipitates having a multimodal size distribution with at least one mode corresponding to a size of less than about 100 nanometers. A coating 120 is disposed over substrate 110 at an interface 130. Coating 120, of which at least about 50 volume percent is substantially free of rapid solidification defects, includes a) a MCrAlX composition, b) a plurality of prior particle boundaries, and c) at least about 30 percent gamma phase by volume of the coating and at least about 10 percent beta phase by volume. An interdiffusion zone 140 has a thickness of less than about 5 micrometers.

The above attributes of article 100 are derived from certain aspects of methods used in its fabrication. In particular, the present inventors have found that the composition of the metal powders used to deposit coating 120 may play an important role in developing the advantageous features described above. Embodiments of the present invention thus include methods for preparing feedstock powders, and the use of such prepared powders in fabricating article 100.

In one embodiment, a method includes heat-treating a quantity of metallic powder. The powder includes particulates comprising at least two elements and a plurality of rapid solidification artifacts present within the particulates, as would be typical for powders formed by atomization techniques or other techniques involving rapid solidification from a molten state. Heat treating the powder is performed at a combination of time and temperature effective to remove substantially all of the rapid solidification artifacts of the powder, thus rendering the powder material to a condition that is more indicative of chemical equilibrium than the material was prior to heat treatment.

To be effective in eliminating rapid solidification artifacts, the heat treatment is typically performed at a temperature at which substantial diffusion of constituent elements occurs within practical processing times. The selection of time and temperature thus depends in large part on the type of material being processed. For example, in one embodiment, the particulates of the powder comprise a MCrAlX composition as described for coating 120, above. In such embodiments, the heat treatment temperature may be in a range from about 925 degrees Celsius (about 1700 degrees Fahrenheit) to about 1200 degrees Celsius (about 2200 degrees Fahrenheit) depending in part on the time allotted for heat treatment. In some embodiments, the heat treatment temperature is maintained for a time of at least 5 minutes, and may range up to several hours.

Notably, in certain embodiments the MCrAlX material, after the heat treatment step, includes a gamma phase (face-centered cubic nickel-rich phase) and a beta phase (ordered body-centered-cubic phase of nominal composition NiAl). Typically, obtaining a significant portion of gamma phase using as-received MCrAlX material, such as CoNiCrAlY powder, for example, as feedstock is difficult due to the rapid solidification of the powder during its manufacture. In stark contrast, the powder composition in accordance with some embodiments of the present invention includes at least about 25 percent by volume of gamma phase after the heat treatment step. Moreover, the microstructure of the powder particulates after heat treatment is remarkably low in deleterious intermetallic phases; in some embodiments the composition comprises gamma and beta phases, and also has less than 1 percent of sigma phase by volume. The advantages provided by these attributes have been described above for coating 120.

Heat treating the powder may be done in any of several ways. For example, the powder may be disposed in a thin layer on an inert surface, such as a ceramic crucible, with the crucible disposed in a furnace. Generally the atmosphere during heat treatment is maintained to be substantially inert to the powder material to avoid detrimental reactions, e.g., oxidation. An argon atmosphere is one example, and practitioners in the art of metal heat treating are familiar with this and other alternatives. One prevalent consideration for the heat treatment of the powders is sintering of adjacent particulates at the elevated temperature. Where powders are heated as a static layer, a sheet of loosely sintered particulate may form during heat treatment. Even in embodiments employing agitation of the particles during heating, as through the use of a fluidized bed furnace, a rotary furnace, or ultrasonic agitation, some degree of sintering may occur. In such cases, the heat treated product is then mechanically processed, such as by breaking up sintered sheets and/or milling the sintered material in a ball miller, a swing mill, attrition mill, or similar apparatus used in the art of mechanical processing, to achieve a processed powder having the desired size distribution. The desired size distribution will depend in large part on the process used to form the powder into coating 120. In one embodiment, the heat treated and milled product is passed through a 635 mesh screen to provide a product having a maximum particle size less than about 20 micrometers.

One embodiment of the present invention includes the powder formed from the method described above.

Having been heat treated and, if needed, mechanically processed to provide a desired particle size distribution, the powder is then ready to be deposited onto a substrate, such as, but not limited to, substrate 110, to form a coating, such as, but not limited to, coating 120 of article 100. Embodiments of the present invention thus include disposing a coating material 120 on a substrate 110, wherein the powder processed as described above is used as a feedstock for the coating material 120. This disposing step may be performed as an extension of the powder processing steps described above, or may be performed as a stand-alone method, where powder processed as described above is supplied separately as an input to the method. In either case, the method selected for depositing the processed powder is a spray method that does not melt a substantial portion of the particulates in the feedstock. Here "a substantial portion" means a portion of the particulates sufficient to form the coating described above. This is done to preserve the advantageous microstructural attributes of the powder material achieved by the heat treatment described above; melting and the rapidly resolidifying the material, as in an air plasma spray process, may remove all of these advantageous features and produce coatings with rapid solidification artifacts. Examples of acceptable methods include cold-spraying, flame spraying, air plasma spraying (APS) high-velocity oxyfuel spraying (HVOF), and high-velocity air-fuel spraying (HVAF). The last four techniques typically include the use of liquid injection to help maintain feedstock temperatures below the melting point of the material. In a particular embodiment, the depositing step includes the use of liquid-injection HVAF, also known as combustion cold spray, as described in U.S. patent application Ser. No. 12/790,170.

In embodiments intended to provide a superalloy-based substrate with enhanced resistance to high-temperature corrosion and/or oxidation, coating applications that employ liquid injection, especially those in which the liquid also serves as a carrier for feedstock particles, such as liquid injection HVAF, are particularly desirable. This is because in these embodiments, where the coating serves primarily a chemical function (i.e., corrosion resistance) rather than a structural function (e.g., mechanical reinforcement), comparatively thin coatings are desirable to avoid problems associated with mechanical properties of the substrate, such as debits in fatigue strength. Fine particles typically produce thin coatings of higher quality than coarse particles, but techniques such as conventional cold spray that employ gas-based powder feed systems are difficult to use with fine powders, as the particles are difficult to feed well into the gas stream, and are prone to clogging. Liquid-fed systems, on the other hand, lend themselves to the use of fine particle feed stocks because the liquid prevents clogging and provides desired momentum to ensure the particles are adequately entrained within the gas plume.

Moreover, the cold spray process, which is capable of very high particle velocity and momentum, produces coating structures in which the particles are metallurgically bonded to the substrate and to themselves. Under some conditions, such a high degree of bonding can be associated with mechanical property debit of the substrate material, such as in fatigue strength. Coating processes that employ liquid injection of particles, in contrast, allow for sufficient particle velocity for the particles to be mechanically bonded to the substrate and to themselves. That level of particle bonding provides for adequate coating adherence to the substrate, but it reduces the potential for mechanical property debit of the substrate.

The substrate 110 upon which coating 120 is disposed in the step may be any of the materials described above for substrate 120. In particular embodiments, substrate 120 comprises a nickel-based superalloy, a nickel-iron-based superalloy, or a cobalt-based superalloy.

The resulting article 100 formed by the methods described herein may have any of the attributes described for article 100 above. For example, the article 100 may be heat treated after coating 120 is deposited, but heat treatment is typically restricted to a time/temperature combination that does not substantially alter the microstructure (particularly the precipitate size and/or distribution) of substrate 110. An interdiffusion zone 140 may form as a result of the coating process and/or any subsequent heat treatment, but the thickness of interdiffusion zone is, in some embodiments, maintained below about 5 micrometers.

In one illustrative embodiment, a method in accordance with embodiments described herein includes heat-treating a quantity of powder having particulates comprising a MCrAlX composition at a temperature in a range from about 925 degrees Celsius to about 1200 degrees Celsius for at least about 5 minutes to form a processed powder; and disposing a coating material 120 on a substrate 110 using a technique that does not melt a substantial portion of the particulates in the feedstock, such as cold-spraying, flame spraying, air plasma spraying, high-velocity oxyfuel spraying, or high-velocity air-fuel spraying, wherein the processed powder is used as a feedstock for the coating material. The substrate 110 comprises a nickel-based superalloy having a population of gamma-prime precipitates, the population having a multimodal size distribution with at least one mode corresponding to a size of less than about 100 nanometers. Alternatively, the substrate 110 comprises a nickel-iron-based superalloy having a population of gamma-double-prime precipitates having a median size less than about 300 nanometers.

In another illustrative embodiment, a method comprises disposing a coating 120 onto a substrate 110 by spraying a feedstock, the feedstock comprising a plurality of particulates comprising at least two elements, such as any of the MCrAlX materials described previously, and having at least a portion of the plurality of particulates substantially free of rapid solidification artifacts. Spraying the feedstock comprises using a deposition technique that does not melt a substantial portion of the particulates in the feedstock, such as by cold-spraying, flame spraying, air plasma spraying, high-velocity oxyfuel spraying, or high-velocity air-fuel spraying, as noted previously. Substrate 110 comprises a precipitate-strengthened alloy, the alloy comprising a) a population of gamma-prime precipitates, the population having a multimodal size distribution with at least one mode corresponding to a size of less than about 100 nanometers; or b) a population of gamma-double-prime precipitates having a median size less than about 300 nanometers.

EXAMPLES

The following examples are presented to further illustrate non-limiting embodiments of the present invention.

Example 1

Powder Processing

Approximately 50 grams of CoNiCrAlY powder (~10 micrometers average size) was placed into an alumina boat and shaken lightly to distribute in a thin, uniform layer. The powder was placed into a tube furnace and heat treated under an argon atmosphere at 1121 degrees Celsius for a period of 15 minutes, followed by a natural furnace cool. Following heat treatment, the metal powders had partially sintered to form a solid sheet. The sheet was broken into approximately 25 millimeter sized flakes by hand, and the flakes were then loaded into a swing mill. The swing mill was operated for 6 minutes, which produced a fine, free-flowing powder. Powder was finally sieved through a #635 mesh to form the starting stock for subsequent thermal spray experiments.

Example 2

Coating Deposition

Thermal spray experiments were conducted using a liquid-injection high velocity air-fuel (HVAF) thermal spray process previously described in detail in U.S. patent application Ser. No. 12/790,170 to deposit a coating having a nominal thickness of about 20 micrometers. Powder temperature during spraying was maintained sufficiently low to prevent melting and excessive oxidation during deposition. A typical microstructure obtained using this process with the heat treated CoNiCrAlY powder of Example 1 included gamma phase and beta phase regions that were clearly observable via scanning electron microscopy. For comparison, a coating of the same composition sprayed under the same conditions but using as-received (as-atomized) powder showed rapid solidification artifacts from the atomization process. For example, transmission electron microscopy analysis of the coatings made using the conventional powder revealed the presence of sigma phase along with beta phase. In contrast, the coating made with heat treated powder was composed primarily of the more desirable gamma phase, and includes beta phase, with no detectable sigma phase.

Example 3

Mechanical Testing

In general, the coating made with heat-treated powder is expected to have improved mechanical properties as the gamma phase is inherently ductile, while sigma phase is typically brittle. Low cycle fatigue experiments were conducted to test the benefit of powder heat treatment. Coatings of approximately 25 micrometer thickness were applied to nickel-based superalloy test bars and cycled to failure at 400 degrees Fahrenheit (about 204 degrees Celsius) with a peak strain of ~0.6 percent and an A ratio equal to 1. Relative to the average life of uncoated material, test bars coated with the as-received powder showed a debit of approximately −1.2 standard deviations. In contrast, the use of heat treated powder resulted in no measurable property debit and a fatigue life equal to that of uncoated material.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:

a substrate comprising a precipitate-strengthened alloy, the alloy comprising:

a) a population of gamma-prime precipitates, the population having a multimodal size distribution with at least one mode corresponding to a size of less than about 100 nanometers; or b) a population of gamma-double-prime precipitates having a median size less than about 300 nanometers; and a coating disposed over the substrate, wherein the coating comprises (a) aluminum, chromium, and M, wherein M is at least one element selected from the group consisting of nickel, cobalt, and iron, (b) a gamma phase and a beta phase, and a sigma phase where the sigma phase is less than 1 percent by volume of the coating, and (c) a plurality of prior particle boundaries, and wherein at least a portion of the coating is substantially free of rapid solidification artifacts.

2. The article of claim 1, wherein at least about 10 volume percent of the coating is substantially free of the rapid solidification artifacts.

3. The article of claim 1, wherein at least about 50 volume percent of the coating is substantially free of the rapid solidification artifacts.

4. The article of claim 1, wherein the substrate comprises a nickel-based superalloy, a nickel-iron-based superalloy, or a cobalt-based superalloy.

5. The article of claim 1, wherein the substrate comprises nickel-based superalloys.

6. The article of claim 1, wherein the coating comprises at least about 5 weight percent aluminum.

7. The article of claim 1, wherein the coating comprises a MCrAlX composition, wherein X comprises at least one element selected from the group consisting of yttrium, rhenium, tantalum, molybdenum, rare earth elements, hafnium, zirconium, silicon, and combinations thereof.

8. The article of claim 1, wherein the coating comprises cobalt; from about 28 percent to about 35 percent nickel; from about 17 percent to about 25 percent chromium; from about 5 percent to about 15 percent aluminum; and from about 0.01 to about 1 percent yttrium.

9. The article of claim 1, wherein the gamma phase is present at a concentration of at least about 25 volume percent of the coating.

10. The article of claim 9, wherein the beta phase is present at a concentration of at least about 10 volume percent of the coating.

11. The article of claim 1, wherein the coating is disposed in direct contact with the substrate at an interface, and wherein an interdiffusion zone between the coating and the substrate has a thickness of less than about 5 micrometers.

12. The article of claim 1, wherein the article is a component of a gas turbine assembly.

13. The article of claim 1, wherein the article is a turbine disk.

14. An article comprising:

a substrate comprising a nickel-based superalloy, the nickel-based superalloy comprising a population of gamma-prime precipitates, the population having a multimodal size distribution with at least one mode corresponding to a size of less than about 100 nanometers; and a coating disposed over the substrate at an interface, the coating comprising a) a MCrAlX composition, b) a plurality of particle boundaries, and c) a gamma phase of at least about 25 percent by volume of the coating, a beta phase in a range from about 10 percent to about 75 percent by volume of the coating, and a sigma phase where the sigma phase is less than 1 percent by volume of the coating;

wherein at least about 50 volume percent of the coating is substantially free of rapid solidification artifacts; and wherein an interdiffusion zone extending from the interface into the substrate has a thickness of less than about 5 micrometers.

* * * * *